UNITED STATES PATENT OFFICE 2,361,454

TEXTILE PRINTING COMPOSITION

Norman S. Cassel, Ridgewood, N. J., assignor to Interchemical Corporation, New York, N. Y., a corporation of Ohio No Drawing. Application May 27, 1940, Serial No. 337,495

3 Claims. (Cl. 8—62)

This invention relates to the art of textile printing, and is directed particularly to new compositions intended for textile decorating, comprising emulsions of thickened aqueous dyestuff dispersions in a continuous organic liquid phase.

The conventional method of textile printing involves the application to a textile fabric of a dye or a dye component in water solution, by means of an intaglio cylinder. In order to get the dyestuff solution thick enough to remain in the cells of the printing cylinders, and to remain in place when applied to the fabric, water-soluble thickening agents such as British gum, starch and the like are used. More recently, wetting agents have been added to the pastes to improve their printing properties. After printing, the dyes are set by various means so that they become water-insoluble, and the fabric is washed to remove the water-soluble thickeners.

Certain difficulties are encountered with these conventional dyestuff pastes. Since the fabrics printed are rather water-absorbent, prints made with water solutions, even when made viscous with the water-soluble thickeners, tend to spread out slightly from the point of application, a phenomenon known as flushing. As a result, the lines in the engraving may become somewhat blurred, and very fine lines close together may be entirely lost. When the viscosities of the pastes are adjusted so that no flushing occurs, the pastes become too thick to separate cleanly from the engravings. A compromise must always be made, so that effective separation occurs without substantial flushing; and the cylinders must be so prepared as to print most easily. Fine photogravure engravings have, as a consequence, never been used with conventional textile printing pastes, because their faithful reproduction of detail would not register on the fabric. Furthermore, the engravings used must be rather deep in order to get effective printing, and considerably more paste is used than is really necessary to produce most designs.

Another disadvantage of conventional dyestuff pastes is that a substantial quantity of dyestuff may be washed out with the thickeners. This is due partially to mechanical suspension of converted dyestuff in the film of thickener, partially to incomplete conversion of the dyestuff to the insoluble form, due to the trapping of the soluble dyestuff inside of the thickener film, and, in some cases, partially to actual dyeing of the thickener. This may represent a serious loss of dyestuff.

In my co-pending application, Serial No. 215,585, filed June 24, 1938 (now U. S. Patent No. 2,202,283, issued May 28, 1940), of which this is a continuation in part, I have disclosed a means whereby these disadvantages may be overcome, and successful dyestuff printing can be done with photogravure and other relatively shallow engravings, with the retention of the complete detail of the photogravure cylinders, and the use of a minimum of dyestuff. As therein disclosed, this means comprises the preparation of dyestuff printing pastes by the emulsification of an aqueous solution of a dye or a dye component capable of producing permanent dyeings on the fabrics with a water-immiscible bodying composition (preferably a solution of a film-forming substance in a solvent), the dyestuff solution being in the discontinuous phase. The resultant emulsion, of optimum consistency for printing, is applied to a fabric, as with a conventional intaglio cylinder; the dyestuff is fixed on the fabric, and the fabric is then dried, with or without washing, depending on the dyestuff employed.

As the emulsion is applied to the cloth and the emulsion breaks, the dyestuff solution penetrates into the yarns of the fabric. Since the water phase and the bodying agent are mutually repellent, the non-aqueous phase prevents undue spreading of the aqueous phase. As a result, substantially no flushing occurs, and fine printing is obtained, which preserves the fine lines of a photogravure engraving even on materials which are as difficult to print as cotton flannels.

While unusually sharp bright prints are obtained with these pastes, with minimum washing away of color, these pastes have one disadvantage. With deep engravings, the aqueous inner phase of the emulsion is often driven deep into the fabric, so that the coloring effect is driven deeper into the fabric than necessary, resulting in reduced economy of dyestuff.

I have now discovered that this difficulty can be overcome by thickening the inner aqueous phase of the emulsion with a water-dispersible thickener which imparts viscosity to the aqueous phase. If desired, the thickener in the aqueous phase may be a substance which is convertible to a water-insoluble form during the formation of the insoluble dyestuff (e. g., urea formaldehyde resins, hydroxyethyl cellulose); in such cases, the material may be used to impart a water-insoluble finish to the fabric, or may supplement the dyestuff with pigment.

I have also discovered new compositions from which these thickened inner phase emulsions can be readily and economically made, and an improved method of making these thickened inner phase emulsions, from the new compositions. These new compositions comprise dispersions of water-dispersible thickeners in water-immiscible lacquers (i. e., liquids comprising solutions of water-insoluble film-forming substances in a water-immiscible organic solvent or solvent mixture). The thickened inner phase emulsions are made from these compositions by stirring a dispersion of the thickener in the lacquer with water; the water emulsifies into the lacquer and leaches the thickener from the lacquer, to produce the thickened inner phase emulsion.

The dyestuff may be added to the emulsion in any desired manner. One method of adding the dyestuff is to disperse it with the thickener in the lacquer, and permit the water to leach the dyestuff out together with the thickener. A second method is to add it in solution in the water used for making the emulsion and leaching the thickener. A third and perhaps the most flexible method is to make up a separate dyestuff emulsion to which no thickener has been added, and to mix the thickened inner phase emulsion with the dyestuff emulsion.

Typical examples of my invention are the following:

EXAMPLE 1

*Rapidogen dyestuff printing paste*

A dispersion of wheat starch in lacquer is prepared by mixing—

- 35 parts by weight dry wheat starch with a lacquer consisting of—
- 7 parts by weight ethyl cellulose—standard ethoxy content—500 centipoise viscosity
- 11.6 parts by weight denatured alcohol
- 46.4 parts by weight toluene

100

An emulsion is then prepared by mixing 6.5 parts of the above novel starch dispersion with—

- 0.2 parts 75% latex
- 22.6 parts Solvesso #2 (hydrogenated petroleum naphtha, boiling range 135–177° C.)

To this mixture is added a solution of—

- 1.25 parts caustic soda, in
- 69.45 parts water (hot)

The mixture is thoroughly stirred and passed through a colloid mill. The result is an uncolored emulsion containing 0.15% rubber and 0.45% ethyl cellulose, based on emulsion weight in the continuous phase, and 2.28% starch in the aqueous phase.

Dyestuff may be added to this emulsion either by dispersing it in the original lacquer, or by dissolving it in the water. It may also be added by merely mixing the above emulsion with the desired amount of a dyestuff emulsion, such as one having the following constitution:

- 0.75 ethyl cellulose (as above)
- 0.25 75% latex
- 4.40 pine oil
- 3.50 toluene
- 27.10 Solvesso #2
- 60.00 dyestuff solution (10% aqueous solution of Rapidogen Red R, General Dyestuffs Corp. U. S. P. No. 1,882,560)
- 4.00 water

100

A ratio of 2 or more thickened inner phase emulsion to 1 dyestuff emulsion is satisfactory. The print is developed by acid ageing in conventional fashion.

EXAMPLE 2

*Stabilized azo dyestuff printing paste*

A dispersion is made with—

- 60 parts wheat starch, dispersed in a lacquer consisting of—
- 15 parts linseed oil modified glycerol phthalate resin (45% linseed oil, 55% glycerol phthalate)
- 20 parts mineral spirits (petroleum naphtha—boiling range 150–200° C.)
- 4 parts water
- 1 part 40% formaldehyde

100

The water aids in dispersing the starch, being absorbed by it.

A thickened emulsion can then be made from—

- 5 parts above dispersion
- 15 parts mineral spirits, as above
- 80 parts boiling water This is an acid stable emulsion, which can be used to make pastes with acid dyestuff components such as diazo salts. Thus, the above thickened emulsion can be used to mix with a dyestuff emulsion; or dyestuff can be dissolved in the boiling water used in the preparation of the thickened emulsion from the starch dispersion. Typical of the diazo compounds which can be used is Variamine Blue RT (General Dyestuffs Corp.—Schultz Color Index—Supplementary #1—#114A). These pastes are printed on fabric impregnated with coupling components to yield ingrain colors.

EXAMPLE 3

*Alginate dispersion*

A satisfactory thickened emulsion can be prepared from the following dispersion, using the same proportions and procedure as in Example 1, to produce the emulsion and the finished printing paste:

- 12 parts sodium alginate
- 7 parts 500 centipoise ethyl cellulose
- 10 parts ethanol
- 71 parts toluene

EXAMPLE 4

*Dyestuff starch dispersion*

The dyestuff and starch may be dispersed together into a water-immiscible lacquer, and this may be then treated with water. Thus, I make a dispersion of—

- 1.50 parts wheat starch
- 4.00 parts dyestuff (for example, 4 nitro-o-anisidine diazotized and coupled with guanidine, mixed with the necessary amount of the ortho-anisidide of beta hydroxy naphthoic acid to couple with the diazo compound after hydrolysis of the guanidine)

in a lacquer consisting of—

- 0.36 parts 500 centipoise ethyl cellulose
- 0.16 parts latex (75%)
- 0.40 parts denatured alcohol
- 1.60 parts toluene
- 2.40 parts pine oil
- 1.08 parts Solvesso #2
- .50 parts water An emulsion is then made with 21.0 parts Solvesso #2
8.0 parts water, and
59.0 parts of a boiling mixture of
    4.25 parts 25% caustic soda
    54.75 parts water This is a representative strong printing paste which may be reduced as desired for shade. The dye is set in an acid ager.

EXAMPLE 5

*Printing paste from thickened dyestuff solution*

The emulsion paste may also be prepared by emulsifying both the dyestuff solution and the starch solution into a lacquer; thus—

19.70 parts of a 15% aqueous wheat starch solution, and
53.30 parts of a dyestuff solution, prepared by dissolving—
    7.5 parts of the dyestuff of Example 4, in
    8.0 parts 25% NaOH
    84.5 parts H2O are emulsified into a lacquer comprising—

0.55 parts 500 centipoise ethyl cellulose
0.24 parts 75% latex
0.60 parts denatured alcohol
2.55 parts toluene
21.86 parts Solvesso #2
1.20 parts pine oil This paste is printed on cloth, and passed through an acid ager as in Example 1.

Vat dyestuffs are particularly difficult to print from aqueous emulsions, since the oxidized dyestuffs are often very hydrophobe, and tend to flush into the organic phase.

By dispersing them in the hydrophile materials I use to thicken the inner phase, this tendency to flush into the organic phase is counteracted. A typical example of this phase of my invention is the following:

EXAMPLE 6

*Vat dyestuff paste*

51.5 parts of a 20% aqueous vat dyestuff paste, such as Indanthrene Violet 2R (1924 Color Index 1104)
36.0 parts glycerol
12.5 parts dry starch are heated to 75° C. until the mass starts to thicken, and then passed over a three-roll mill to smooth out the paste.

70.0  parts by weight of the parts is then dispersed in a lacquer phase consisting of—
    1.33 parts by weight 500 centipoise ethyl cellulose
    1.33 parts by weight rubber latex (75%)
    9.00 parts by weight pine oil
    18.34 parts by weight Solvesso #2

100

The lacquer may be used for printing by mixing—

27.80 parts by weight above with
18.75 parts by weight Solvesso #2
7.80 parts by weight K2CO3
16.00 parts by weight sodium sulfoxylate
29.65 parts by weight water

100

The vat dyestuff is developed by reduction and oxidation in conventional manner.

EXAMPLE 7

*Pigment*

A mixed dyestuff pigment print can be obtained by using a water-soluble thickener which can be made water-insoluble—e. g., urea resins, hydroxy ethyl cellulose, etc. Thus, in Example 5, the 15% aqueous starch solution can be replaced by the same amount of a solution comprising—

6.0 parts by weight hydroxy ethyl cellulose
3.3 parts by weight NaOH
7.5 parts by weight lamp black
83.2 parts by weight water On passing through the acid ager after printing, the dyestuff is set and the hydroxy ethyl cellulose insolubilized. A brown print of fairly good wash fastness is obtained.

While I have shown only a few examples of my invention, it is obvious that examples may be multiplied indefinitely without departing from the scope thereof, which is defined in the claims.

It is obvious that other dyestuffs of the types shown may be used, and that water-soluble dyestuff components of other types (direct dyestuffs, mordant dyestuffs, etc.) may be applied to cloth by the methods and compositions described herein. Obviously, acid, alkali and other chemicals necessary to put the dyestuffs in solution may be added. Care should, however, be taken that the continuous phase of the emulsion be not attacked by the particular aqueous system employed.

Any thickener which is auto dispersible in the aqueous inner phase (water or aqueous solutions of chemicals) may be used in the aqueous inner phase. Enough should be present to substantially increase the viscosity of the water; a marked improvement is attained when the consistency of the inner phase equals that of a ½% aqueous solution of wheat starch. The effect is cumulative with increasing percentages of thickener, but the increase in surface effect is counteracted by the loss of color with the thickener, so that I prefer not to exceed 5% of the total printing paste. Satisfactory thickeners include starch, dextrine, British gum, water-soluble cellulose derivatives (e. g., methyl cellulose), alkali-soluble cellulose derivatives (e. g., hydroxy ethyl cellulose), alginates, water-soluble synthetic resins (urea-formaldehyde, sodium salts of polyacrylates, etc.).

With respect to the continuous outer phase, the dissolved substance chosen need be only sufficiently film-forming to be capable of forming a continuous phase about the dyestuff solution. I have found that water-immiscible solutions in organic solvents of most water-insoluble film-forming organic compounds may be used successfully, and have successfully used bodied oils, alkyd resins, hydrophobe urea-formaldehyde resins, cumarone-indene resins, natural resins such as damar and batu, rosin glycerol ester gums, cellulose esters such as nitrocellulose and cellulose acetate, cellulose ethers such as benzyl and ethyl cellulose, rubber and rubber derivatives, synthetic rubber-like materials such as polychloroprene, poly isobutylene, and fatty acid soaps which promote water-in-oil emulsification. Substantially any water-immiscible solvents may be used; water-miscible solvents should be present in no more than small percentages or the stability of the emulsions may be seriously impaired.

The amount of solute employed should be kept at a minimum consonant with stability of the emulsion, and in general the continuous phase should likewise be kept at a minimum. I prefer to maintain the water-immiscible solute under about 5% of the total emulsion weight. The total of water-soluble thickener and water-insoluble film-forming solute used should preferably be kept under 10% of the total emulsion, and most preferably is kept below 5%, as will be observed in the examples.

In the specification and claims, the term "dyestuff" means a complete dye, or a component of a dye, and the term "undeveloped dyestuff" means that the dye or dye component is in such form that it lacks the color of the finished dye on the fabric.

I claim:

1. A textile dyestuff decorating paste comprising an emulsion, the outer phase of which comprises a water-immiscible solution of a water-insoluble film-forming substance in a volatile organic solvent, and the inner phase of which comprises a solution of a dyestuff in an aqueous medium thickened by the dispersion of an auto-dispersible thickener therethrough to a consistency at least equal to that of a ½% aqueous wheat starch dispersion, the quantity of auto-dispersible thickener being at least about as great as the quantity of water-insoluble film-forming substance, and not to exceed 5% of the paste.

2. A textile dyestuff decorating paste comprising an emulsion, the outer phase of which comprises a water-immiscible solution of a water-insoluble film-forming substance in a volatile organic solvent, and the inner phase of which comprises a solution of a dyestuff in an aqueous medium thickened by the dispersion of an auto-dispersible thickener therethrough to a consistency at least equal to that of a ½% aqueous wheat starch dispersion, the quantity of auto-dispersible thickener being at least about as great as the quantity of water-insoluble film-forming substance, the auto-dispersible thickener and film-forming substance together comprising not to exceed 5% of the total paste.

3. The composition of claim 2, in which the dyestuff is undeveloped.

NORMAN S. CASSEL.